United States Patent
Zhao et al.

(10) Patent No.: US 8,787,552 B1
(45) Date of Patent: Jul. 22, 2014

(54) CALL CENTER ISSUE RESOLUTION ESTIMATION BASED ON PROBABILISTIC MODELS

(71) Applicant: Xerox Corporation, Norwalk, CT (US)

(72) Inventors: Shi Zhao, Palatine, IL (US); Han Ye, Chapel Hill, NC (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/755,356

(22) Filed: Jan. 31, 2013

(51) Int. Cl.
*H04M 3/523* (2006.01)

(52) U.S. Cl.
USPC ............ 379/265.06; 379/265.05; 379/265.07; 379/265.08

(58) Field of Classification Search
None
See application file for complete search history.

(56) References Cited

U.S. PATENT DOCUMENTS

| | | | |
|---|---|---|---|
| 6,603,854 B1 | 8/2003 | Judkins et al. | |
| 6,748,072 B1 | 6/2004 | McGraw et al. | |
| 7,203,655 B2 | 4/2007 | Herbert et al. | |
| 7,720,706 B2 | 5/2010 | Herbert et al. | |
| 8,150,021 B2 | 4/2012 | Geva et al. | |
| 8,175,253 B2 | 5/2012 | Knott et al. | |
| 2004/0013248 A1* | 1/2004 | Ciavolino | 379/93.13 |
| 2006/0256952 A1* | 11/2006 | Rogers et al. | 379/265.02 |
| 2012/0051536 A1 | 3/2012 | Chishti et al. | |

* cited by examiner

*Primary Examiner* — Harry S Hong
(74) *Attorney, Agent, or Firm* — Fox Rothschild LLP

(57) ABSTRACT

A system implements a method of assessing performance of a call center agent that includes identifying a set of the one-time caller calls that the agent has handled. A first issue resolution rate is determined for the calls in the set that were released by the customer, and a second issue resolution rate is determined for the calls in the set that were released by the call center agent. The method also includes determining a difference between the first issue resolution rate and the second issue resolution rate. The determined difference is used to generate a performance assessment for the call center agent.

20 Claims, 4 Drawing Sheets

CALL CENTER ISSUE RESOLUTION ESTIMATION BASED ON PROBABILISTIC MODELS

BACKGROUND

Call centers use a number of call agents to service a large volume of calls. Call centers may operate to provide customers with technical support, sales execution and support, and other information and services.

High quality of service and call throughput are desired traits for agents and call centers. Call throughput is easily measured based on a number of calls handled during a period of time, but quality of service may be difficult to evaluate.

Prior art methods of assessing the service quality of call center agents include recording and randomly reviewing calls, or asking each caller to complete a survey after the call. Random review of calls adds expense for oversight, and it often only samples a small portion of calls. A problem with surveys is that the results can be skewed toward positive reviews, as happier callers are more likely to respond to surveys. Also, the apparent scoring scale used by different reviewers may vary. Accordingly, improved methods of assessing of call center agent performance are desirable.

One way to assess agent performance is to obtain a measurement called an issue resolution (IR) rate. The issue resolution rate is typically gathered by surveying customers at the end of each call with a question such as "did the agent solve your problem?" Since participation in the survey is voluntary, relatively few customers typically participate, resulting in a true IR rate for only a small portion of the call center's total calls. Thus, when using prior art assessment methods, the resulting IR rate may not be a reliable indicator of call center agent performance.

This document describes methods and systems that address some of the problems described above, and/or additional issues.

SUMMARY

In an embodiment, a system implements a method of assessing performance of a call center agent. The method includes maintaining, in a computer-readable memory, data corresponding to customer calls received from customers and processed by a call center agent. The maintained data for each call includes an indication of whether the call was a one-time caller call. For each of the one-time caller calls, the data also includes indication of whether the call was released by the customer or whether the call was released by the call center agent.

The method also includes identifying a set of the one-time caller calls, determining a first issue resolution rate for the calls in the set that were released by the customer, and determining a second issue resolution rate for the calls in the set that were released by the call center agent. The method also includes determining a difference between the first issue resolution rate and the second issue resolution rate. The determined difference may be used to generate a performance assessment for the call center agent. Optionally, the determined difference and/or performance assessment also may be used to generate a compensation recommendation for the call center agent. Optionally, performance assessments may be generated for multiple agents, and the method may generate compensation recommendations for the agents based on their relative performance assessments.

In another embodiment, a method of assessing performance of a call center agent includes retrieving, from a computer-readable memory, data corresponding to a set of customer calls processed by a call center agent. The retrieved data for each call includes an indication of whether the call was a one-time caller call. For each of the one-time caller calls, the data also includes an indication of whether the call was released by the customer or whether the call was released by the call center agent. The method includes using the retrieved data to generate a performance assessment for the call center agent, and taking an action corresponding to the performance assessment.

Any of the embodiments described below may be implemented by a system that includes one or more processors, along with one or more computer-readable memory portions containing data and/or programming instructions.

DETAILED DESCRIPTION

Figure 1:
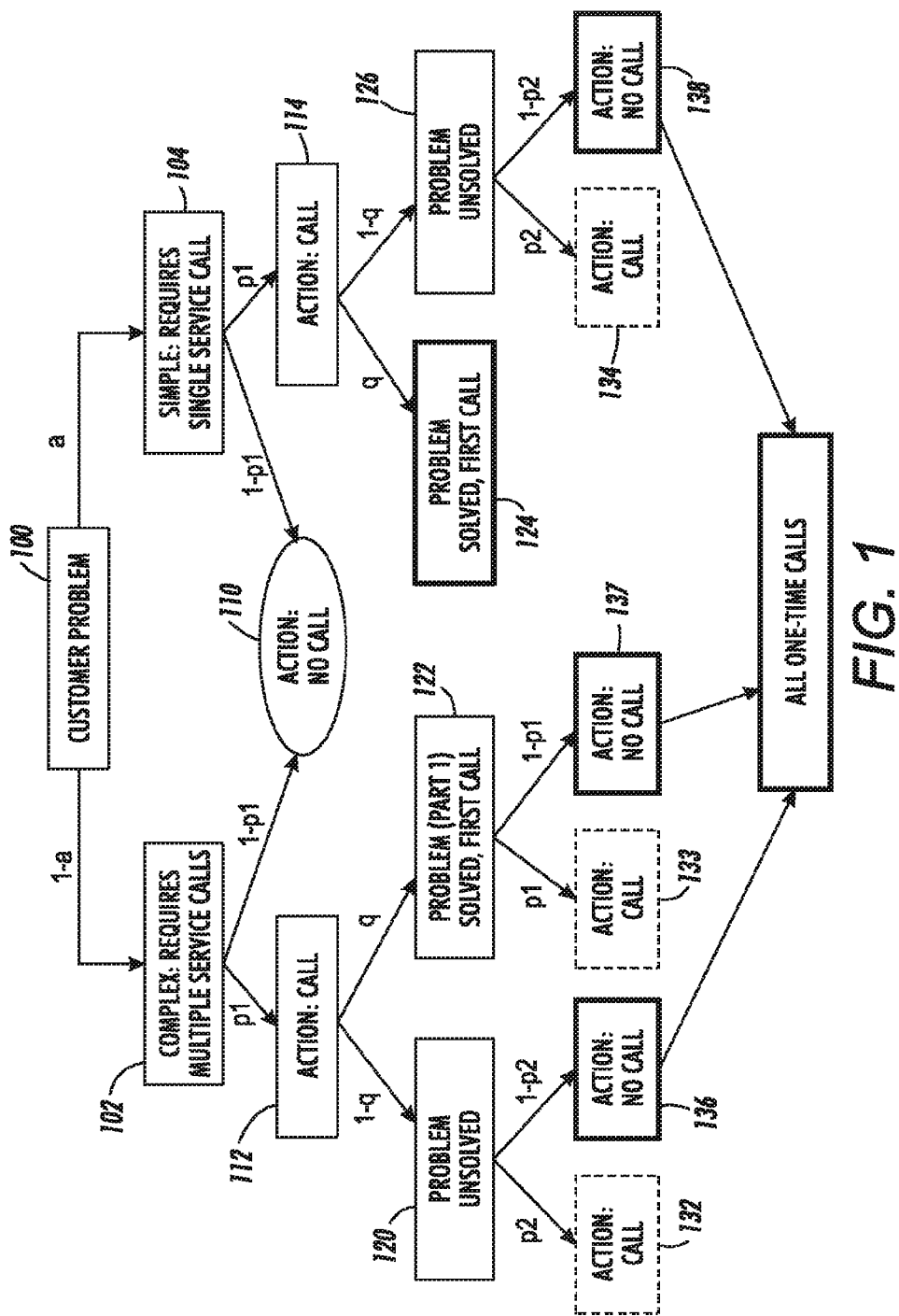
FIG. 1 illustrates a probabilistic model of calls that are handled by an agent, identifying the possible actions and outcomes that can be considered.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this document, a "call center" is an organization, location or group of locations that operates to initiate and/or receive inquiries from customers via phone, interactive messaging applications such as chat applications, or other interactive electronic media. Examples include telemarketing centers, customer technical or product support groups, and centers for receiving customer orders via phone. A "call center agent" is a person who is employed to initiate and/or receive communications, such as phone calls, web chats, or other live communications, from the call center's customers. A "call" refers to any such communication between a customer and a call center agent.

As used in this document, the terms "inquiry," "problem" and "request" are used interchangeably to refer to a question, issue or goal that a customer or call center seeks to resolve through a customer call.

This document describes systems and methods for assessing call center agent performance from a statistical model of call behavior. By using quantitative data, a call center operator or manager may determine an objective, qualitative assessment of performance of each agent. Because this performance evaluation is objectively determined from data, call agent performance can be evaluated without requiring recording or live monitoring of calls for quality assurance or surveys from customers after they have completed a call. However, although manual call recording or live monitoring is not required for the invention, the invention would not exclude systems in which live monitoring and/or recording are used in addition to the assessment methods described below.

The non-use of live monitoring and/or recording of a call does not necessarily preclude the automatic monitoring and collection of certain data during the call to help assess call center agent performance. For example, one way that a call center can track apparent performance of its call agents is to determine the portion of calls handled by a given agent that result in one or more follow-up calls from the same caller within a certain time period. If a caller's issue is resolved during a call, that caller is unlikely to place another call into the call center during the time period. However, if the caller's issue remains unresolved, that caller is more likely to call the call center again within a relatively short period of time. By tracking the caller, such as by caller ID or customer account, and by recording data relating to the call, such as issue complexity and whether or not the issue was resolved, it is possible to determine a probability for each call as to whether the caller will initiate a follow-up call during a time period.

The one-time call rate of an agent is a measure of the calls, or the relative number of calls, handled by an agent that did not result in follow-up calls from the same caller within a predetermined time. In some embodiments, a measure of the agent's one-time call rate may be used to assess an agent's performance. However, while the one-time call rate may be helpful in understanding a call agent's performance, it may not always directly reflect the agent's performance. For example, the agent may be unable to solve a customer problem during a first call, but the customer chooses not to call again. In many cases, the reasons for the caller with the unresolved problem to not call again may be outside the control of the call agent. However, in some cases the caller may have opted to not call again because he or she frustrated with the service provided by the agent. If a call center agent frustrates customers on a regular basis, that agent's one-time call rate may give the false appearance that the agent provides quality service.

Therefore, in some embodiments the methods and systems discussed below assess call center agent performance by looking at the agent's one-time call performance, and also by using a statistical model to analyze the data behind that one-time call performance.

FIG. 1 is a graphic illustration of a statistical model showing the various options of how a call center agent may handle a customer inquiry. The statistical model includes a graphical network of possible actions and resolutions for an arbitrary customer problem or inquiry. The statistical model shown in FIG. 1 is helpful for understanding the impact of call center agent issue resolution performance on the ultimate outcome of a customer's problem or inquiry. By examining these possible outcomes, it is possible to determine meaningful information about a call center agent's performance from available statistics.

In FIG. 1, boxes represent the status of a customer inquiry as a call center handles the inquiry. A customer problem may be received 100, either through a call from a customer or a request to initiate a call to a customer. The customer problem may be assessed for complexity to determine an initial probability of whether it can be resolved in a single call, or whether it may require multiple calls to resolve. For example, a customer having a technical issue may have a simple technical issue 104 that is of the type that could be reasonably resolved by a single call to tech support. On other hand, the technical issue may be of the type that requires additional testing after a first call to tech support. It should be appreciated that the model may include multiple levels of complexity, each of which will be associated with a probability of follow-up calls.

The assessment of complexity may be done in any suitable fashion. For example, when the call is received, the call center agent may use a computing device (or any automated system) to generate a record of the call. The agent may then update the record with one or more data elements that describe the subject matter of the call. Alternatively, an automated monitoring system may use voice recognition or other methods to determine the subject matter of the call based on words spoken by the caller, or by the caller's response to one or more automated questions. Examples of subject matter may include: place order, order status inquiry, report problem with order received, technical support, schedule appointment, etc. The system may include a subject matter data set in which calls of various subject matter are assigned various degrees of complexity. The system may then compare the subject matter of the call with the subject matter data set to identify the degree of complexity to assign to the call.

It should be noted that the complexity of each problem is typically outside the control of a call center agent, but that call center agents within a group may see a similar proportion of complex problems. By considering multiple complexity types for customer problems, the model in FIG. 1 considers factors outside the control of the call center agent that may appear to reflect on the call center agent's performance, but that in fact are independent of the call center agent's performance.

In some embodiments, the complexity of a call may not be immediately known from the subject matter. In such situations, the data set may store data or relational information that relates one or more probabilities of complexity to each subject matter type in the database. For example, FIG. 1 shows a statistical model that considers the probability that a problem falls into a given complexity and a given outcome. A customer problem 100 can be said to have a probability "a" of being a simple problem 104. Conversely, problem 100 can be said to have a probability of 1−a of being complex 102 and thus multiple calls to resolve, even if handled by a skilled agent. An estimation of probability a can be determined by experience, survey, or other known estimation techniques. An exact estimation of probability a may not be necessary to evaluate a call center agent's performance, because the model shown in FIG. 1 may relate to all agents that are associated with a call center, and probability a may be a common trait to all of a call center's agents, or to a subset of the agents.

Within this model it is assumed that a customer has the same probability of contacting the call center regardless of the complexity of the problem or inquiry. When a customer has a problem or inquiry, there is a probability p1 that the customer will contact the call center p1. Conversely, there is a probability of 1−p1 that the customer will not contact the call center. Regardless of the complexity of the problem, if a customer fails to call the call center the end result is action 110, whereby the customer does not place a call. Because the customer has not called the call center, it does not relate to call center performance. However, if a customer calls with a simple problem or inquiry, the resulting action will be action 114 whereby the customer calls with a simple problem. If a customer calls with a complex problem the resulting action will be action 112, whereby the customer calls with a complex problem.

It should be noted that the probability that a customer will place a call into the call center is independent of the quality of service that an agent provides, and the probability p1 can be assumed to be shared among all agents in a group or call center. The call quality provided by an agent can be modeled as a factor q, which is the probability that the agent will solve the problem for which the customer is calling. q can also be considered to be the issue resolution (IR) rate of an agent. One goal of each agent should be to have the highest IR rate possible. However factors such as call throughput, lack of ability or lack of training may prevent q from being as high as desired. Because the IR rate directly impacts the customer experience, it is desirable to monitor and estimate the IR rate for each agent in order to reward high performing agents and take remedial action on underperforming agents. Thus, the IR rate (q) may be agent-specific. The model shown in FIG. 1 can be used to better understand the IR rate q of an agent.

For purposes of this model it is assumed that the likelihood that an agent provides quality service is the same regardless of the complexity of the problem presented. However, the invention is not limited to this option For complex problems requiring multiple calls, a quality call does not necessarily solve the entire problem, but it typically does solve a part of the problem. If the call center merely monitors the one-time call rate for each agent, an agent may unfairly receive a low score for providing quality service to complex problems that require multiple calls. On the other hand, for agents who primarily encounter simple problems, the one-time call rate may be a good indicator of the agent's quality of service. Hence, the probability of complexity a is helpful for understanding the relationship between an agent's one-time call rate and the quality of service q provided by the agent.

An agent handling a call relating to a simple problem has a probability q of solving the problem on the first call. Hence, the call center agent has a probability q of the call resulting in conclusion 124, whereby the problem is solved on the first call. Unless the customer has another problem or inquiry during the same period, the call will be counted toward the agent's one-time call rate. Conversely, the call center agent has a probability of 1−q of failing to solve the problem. As a result, the outcome of the call has a probability of 1−q of being outcome 126, whereby the problem is not solved after the first call.

If the first call center agent handling the problem has failed to provide quality service and the customer problem has reached a result of "not solved" 126, the customer has a probability p2 of calling again 134. The probability p2 is a function of the customer and is typically independent of agent performance. If the customer calls again 134, the failure of the agent to provide quality service on the initial call will be reflected in the one-time call rate. The follow-up call 134 by the caller about the same problem will negatively affect the one-time call rate, as the inquiry will be counted as a multiple-call inquiry. Conversely, there is a probability of 1−p2 that the customer will not follow up with another call 138, even though the call center agent failed to resolve the customer's inquiry on the first call.

For a complex problem 102, it the problem is not resolved on the first call 120, there is also a probability p2 that the customer's follow-up action will be to call again 132, and a probability 1−p2 that the customer's follow-up action will be to not place a follow-up call 136. However, unlike the follow-up call for a simple problem 138, a follow-up call for a complex problem 132 may not reflect poor service by the call center agent. For a complex problem that is resolved on the first call 122, there is a then the probability p1 that the customer will call later with a new problem 133, and an inverse probability 1−p1 that the customer will not make such a call 137. Note that because this probability involves a new problem, the same probability p1 that was used earlier in the model is also used here For illustration in FIG. 1, outcomes that involve one-time calls are shown in boxes with heavy outlining. Outcomes that involve multiple calls are shown in boxes with dashed outlining.

It should be noted that several outcomes, including outcomes 124, 132, 133 and 137, reflect quality service provided by the initial call agent. However, actions 132 and 133 can negatively affect the agent's one-time call rate. This is an example of why the one-time call rate by itself may not be sufficient to assess call center agent performance.

Using the model of FIG. 1, an agent's one-time call rate θ may be may be defined as a measurement (such as a ratio or percentage) of calls made during a time period by one-time callers during a time period. The functional relationship between an agent's one time call rate θ, issue resolution (IR) rate q, and the probabilities a, $p_1$ and $p_2$ may be considered to be:

$$\theta = q \cdot p_1 \cdot p_2 + (a-1) \cdot q \cdot p_1^2 + p_1 - (p_1 \cdot p_2) \qquad \text{[equation 1]}$$

The one-time call rate θ may be determined from operational data or estimated using any suitable process. For example, the one-time call rate could be estimated from domain knowledge or historical data, or estimated as a Poisson rate of one-time calls in a given time frame.

Optionally, the probabilities $p_1$ and $p_2$ may be equal and denoted as p, which would mean that customers care about their problems in a consistent manner. If so, equation 1 may be simplified into:

$$\theta = (a \cdot q \cdot p^2) + p - p^2 \qquad \text{[equation 2]}$$

For example, given θ=4, a=0.5, and p=0.8, q=0.75. This tells us that if 50% of customers have a simple problem, 80% of those customers keep calling the call center until the problem is solved, 40% of the calls are made by one-time callers, and the IR rate (q) for this call center is 0.75. This may be shown by the equation:

$$q = \frac{\theta}{ap^2} + \frac{1}{a} - \frac{1}{ap} \qquad \text{[equation 3]}$$

The IR rate may be considered as one of the most important metrics for call centers. To be able to estimate IR rate is an important task, but in this system it not necessarily the final destination. The present embodiments may consider one or more factors that drive the IR rate to assess agent performance.

For example, one factor to consider may be the rate that calls are terminated or otherwise released by the agent rather than the customer. We may denote $\theta|_{c\text{-}released}$ to be the one time call rate for customer released calls (e.g., the customer hangs up first, or sends a chat message with a "bye" or similar ending salutation). Similarly we denote $\theta|_{a\text{-}released}$ to be the one time call rate for agent released calls. We will see that the IR rates for customer released calls and agent released calls are statistically different. Since both a and p are independent of the agent:

$$\theta|_{c\text{-}released} - \theta|_{a\text{-}released} = a \cdot p^2 (\theta|_{c\text{-}released} - \theta|_{a\text{-}released}) \qquad \text{[equation 4]},$$

where:

$\theta|_{c\text{-}released}$ is the one-time call rate for customer released calls, and $\theta|_{a\text{-}released}$ = is the one-time call rate for agent released calls.

To simplify the notations, we may rewrite the above equation as $\delta_\theta = a \cdot p^2 \cdot \delta_q$, wherein $\delta$ represents a difference. Then we have:

$$\delta_q = \frac{\delta_\theta}{a \cdot p^2}. \qquad \text{[equation 5]}$$

From a sample call center data set, the inventors obtained the following estimate:
$\hat{\delta}_\theta = 3.96\%$,
$\hat{\sigma}_1 \triangleq \text{S.D.}(\hat{\delta}_\theta) = 0.577\%$,
$\hat{a} = 36.93\%$, and
$\hat{\sigma}_2 \triangleq \text{S.D.}(\hat{a}) = 0.0219\%$.
Then:

$$\hat{\delta}_q = \frac{\hat{\delta}_\theta}{\hat{a} \cdot p^2} = \frac{10.72\%}{p^2}. \qquad \text{[equation 6]}$$

Applying the delta method, we get:

$$S.D.(\hat{\delta}_q) \approx \frac{\sqrt{\frac{\hat{\sigma}_1^2}{\hat{a}^2} + \frac{\hat{\delta}_\theta^2 \hat{\sigma}_2^2}{\hat{a}^4} - \frac{2\hat{\delta}_\theta \hat{\sigma}_1 \hat{\sigma}_2}{\hat{a}^3} \cdot \rho}}{p^2} =$$

$$\frac{\sqrt{2.445 \cdot 10^{-6} - 1.987 \cdot 10^{-7} \rho}}{p^2} \leq \frac{0.1626\%}{p^2}$$

where $\rho \triangleq \text{Correlation}(\hat{\delta}_\theta, \hat{a}) \in [-1, 1]$.

Thus, in this example, difference $\delta_q$ between customer released one-time caller calls and agent released one-time caller calls is estimated to be 10.72%. This tells us that who released the call has big difference in terms of service quality. So, the system presumes that the release factor drives IR rate. This allows the system to help call center managers to understand this factor and adjust this factor to improve call center efficiency or performance.

Figure 2:
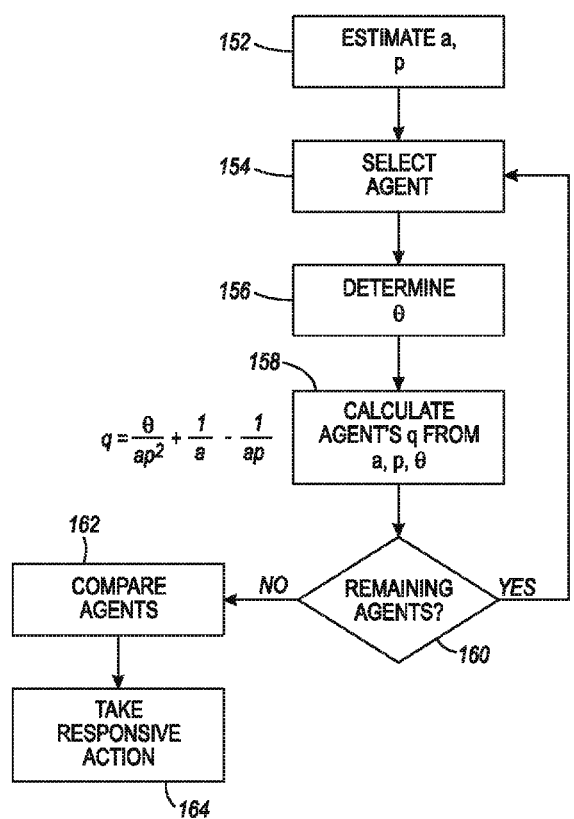
FIG. 2 is a flow chart of various aspects that may be included in a method for assessing agent performance.

FIG. 2 illustrates additional steps that the call center agent performance assessment system may implement. Referring to FIG. 2, the system may estimate a probability that a call will exhibit a specified degree of complexity a (e.g., "simple," "moderately complex," or "very complex"), as well as probability that the caller will initiate a call p (step 152). The system may do this using input data, and/or the methods described above. It may identify an agent (step 154) who handled or will handle the call, determine a one-time call rate θ for the agent as described above (step 156), and determine the agent's adjusted issue resolution rate q (step 158) using methods such as those described above (e.g., equation 3).

The system may then determine whether there are additional agents to analyze (step 160), and if so it may repeat the steps listed above for the additional agents. When assessments are complete for all agents for whom analysis is desired, the system may then compare the IR rates for the agents (step 162) and/or take responsive action (step 164), such as generating a report, or determining a salary adjustment for one or more of the agents. For example, the system may determine a salary adjustment for an agent by identifying a base salary, and then multiply it by a first factor if the IR rate q exceeds at least a first threshold and a second (or higher) factor if the IR rate also exceeds a second (higher) threshold.

As another example, the system may divide a bonus pool or available salary adjustment budgets among agents, and weigh each agent's portion according to the agent's issue resolution rate q.

Figure 3:
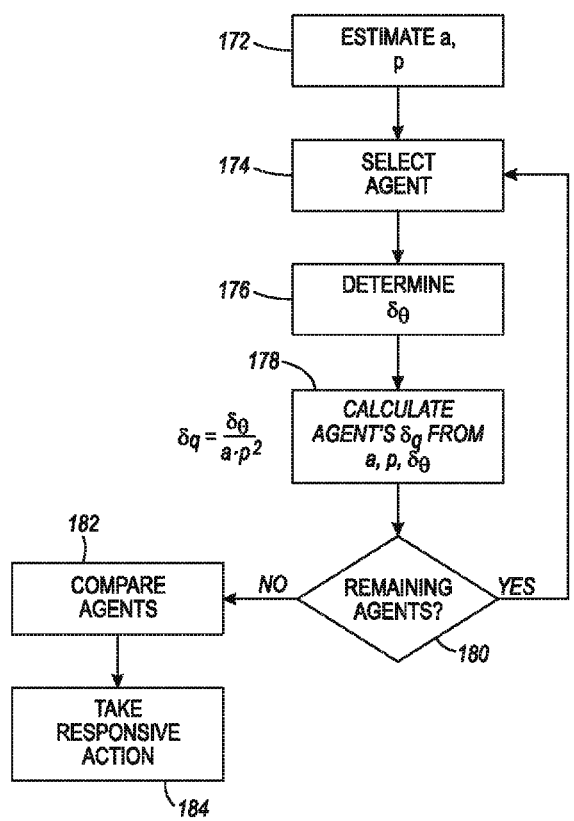
FIG. 3 is a flow chart of additional aspects that may be included in a method for assessing agent performance.

FIG. 3 illustrates additional steps that a call center agent performance assessment system may implement. As with the method of FIG. 2, in FIG. 3 the system may estimate a probability that a call will exhibit a specified degree of complexity a, as well as probability that the caller will initiate a call p (step 172). The system may do this using input data, and/or the methods described above. It may identify an agent (step 174) who handled or will handle the call, determine a one-time call rate θ for the agent as described above (step 176), and determine a difference $\delta_q$ (step 180) between the agent's IR rate for customer-released one-time caller calls and agent-released one-time caller calls using methods such as those described above (e.g., equation 5).

The system may then determine whether there are additional agents to analyze (step 180), and if so it may repeat the steps listed above for the additional agents. When assessments are complete for all agents for whom analysis is desired, the system may then compare the differences $\delta_q$ for the agents (step 182) and/or take responsive action (step 184), such as generating a report, or determining a salary adjustment for one or more of the agents. For example, the system may determine a salary adjustment for an agent by identifying a base salary, and then multiply it by a first factor if the $\delta_q$ exceeds at least a first threshold and a second (or higher) factor if the $\delta_q$ also exceeds a second (higher) threshold. As another example, the system may divide a bonus pool or available salary adjustment budgets among agents, and weigh each agent's portion according to the agent's $\delta_q$.

Figure 4:
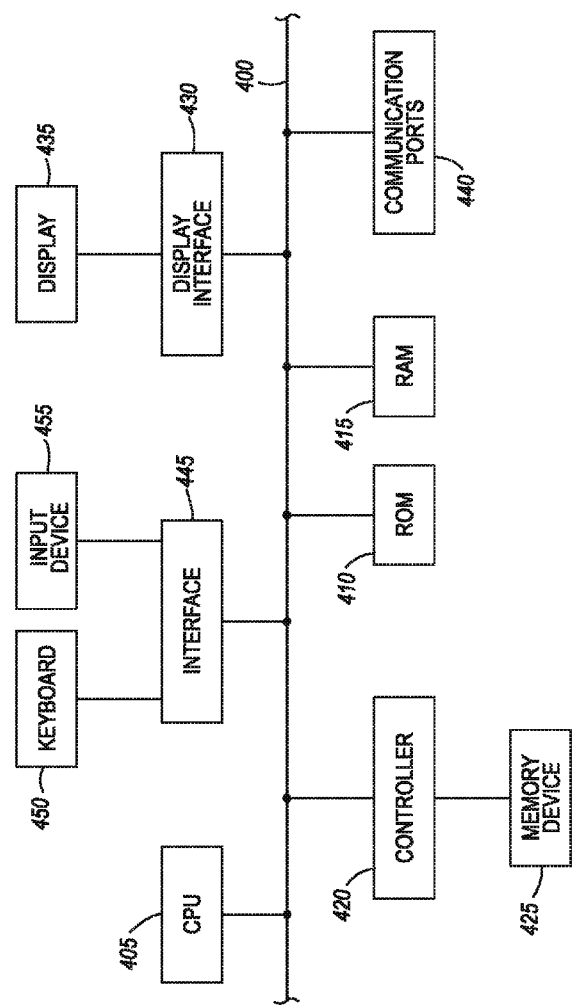
FIG. 4 is block diagram of an example of a computer system that may implement the methods described in this document.

FIG. 4 is a block diagram illustrating various elements of a computer system on which the various systems described above could be implemented. An electrical bus 400 serves as the main information highway interconnecting the other illustrated components of the hardware. Processor (CPU) 405 is a central processing unit of the system, performing calculations and logic operations required to execute a program. CPU 405, alone or in conjunction with one or more of the other elements disclosed in FIG. 3, is a processing device, computing device or processor as such terms are used within this disclosure. Read only memory (ROM) 410 and random access memory (RAM) 415 constitute examples of memory devices.

A controller 420 interfaces with one or more optional memory devices 425 that service as date storage facilities to the system bus 400. These memory devices 425 may include, for example, an external DVD drive or CD ROM drive, a hard drive, flash memory, a USB drive or another type of device that serves as a data storage facility. As indicated previously, these various drives and controllers are optional devices. Additionally, the memory devices 425 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 430 may permit information from the bus 400 to be displayed on the display 435 in audio, visual, graphic or alphanumeric format. Communication with external devices may occur using various communication ports 440. A communication port 440 may be attached to a communications network, such as the Internet, a local area network or a cellular telephone data network.

The hardware may also include an interface 445 which allows for receipt of data from input devices such as a keyboard 450 or other input device 455 such as a remote control, a pointing device, a video input device and/or an audio input device.

Some or all of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the claims.

The invention claimed is:

1. A method of assessing performance of a call center agent, the method comprising:
maintaining, in a computer-readable memory, data corresponding to a plurality of customer calls received from customers and processed by a call center agent, wherein the maintained data comprises:
an indication of whether the call was a one-time caller call, and
for each of the one-time caller calls, an indication of whether the call was released by the customer or whether the call was released by the call center agent; and
by a processor:
identifying, from the plurality of customer calls, a set of the one-time caller calls,
determining a first issue resolution rate for the calls in the set that were released by the customer,
determining a second issue resolution rate for the calls in the set that were released by the call center agent,
determining a difference between the first issue resolution rate and the second issue resolution rate, and
using the determined difference to generate a performance assessment for the call center agent.

2. The method of claim 1, further comprising:
using the determined difference to generate a compensation value recommendation for the call center agent.

3. The method of claim 2, wherein using the determined difference to generate a compensation value recommendation for the call center agent comprises, by a processor:
generating a first compensation amount if the determined difference exceeds a first threshold; and
generating a second compensation amount that is higher than the first compensation amount if the determined difference also exceeds a second threshold that is higher than the first threshold.

4. The method of claim 1, further comprising:
determining a difference value between a first issue resolution rate and a second issue resolution rate for a plurality of additional call center agents;
comparing the difference values for each of the call center agents; and
using the difference values to generate compensation value recommendations for each of the call center agents.

5. The method of claim 1, wherein using the determined difference to generate a performance assessment for the call center agent comprises:
using the determined difference ($\delta_\theta$) between the first issue resolution rate and the second issue resolution rate to determine a measure of difference ($\delta_q$) between customer released calls and agent released calls as a function of an indication of call complexity (a) and a probability of a customer making a follow-up call (p) with a new problem as follows:

$$\delta_q = \frac{\delta_\theta}{a \cdot p^2},$$

and
considering a higher $\delta_q$ to represent higher level of performance, and
considering a higher $\delta_q$ to represent a higher level of performance.

6. The method of claim 1, wherein:
the maintained data also comprises:
a measure of complexity for each call, and
for each of the one-time caller calls, an indication of whether the call was released by the customer or whether the call was released by the call center agent; and
wherein using the determined difference to generate a performance assessment for the call center agent comprises using the determined difference to determine a measure of difference between customer released calls and agent released calls as a function of the indication of call complexity and a probability of a customer making a follow-up call with a new problem.

7. The method of claim 1, wherein identifying the set of one-time caller calls comprises:
for each of the calls, determining whether the call corresponded to a new problem call or an existing problem call;
determining a probability $P_1$ that each customer that made a new problem call will make the new problem call; and
determining a probability $P_2$ that each customer that made an existing problem call will make a follow-up call.

8. A call center agent performance assessment system, comprising:
a first non-transitory computer-readable memory portion storing data corresponding to a plurality of customer calls received from customers and processed by a call center agent, wherein the maintained data comprises:
an indication of whether the call was a one-time caller call, and
for each of the one-time caller calls, an indication of whether the call was released by the customer or whether the call was released by the call center agent;
a second non-transitory computer-readable memory portion storing programming instructions that, when executed, are configured to cause a processor to execute a performance assessment method, the method comprising:
identifying, from the plurality of customer calls, a set of the one-time caller calls,
determining a first issue resolution rate for the calls in the set that were released by the customer,
determining a second issue resolution rate for the calls in the set that were released by the call center agent,
determining a difference between the first issue resolution rate and the second issue resolution rate, and
using the determined difference to generate a performance assessment for the call center agent.

9. The system of claim 8, further comprising additional programming instructions on the second non-transitory computer-readable memory portion that, when executed, are configured to cause a processor to use the determined difference to generate a compensation value recommendation for the call center agent.

10. The system of claim 9, wherein the instructions for using the determined difference to generate a compensation value recommendation for the call center agent comprise instructions to:
generate a first compensation amount if the determined difference exceeds a first threshold; and
generate a second compensation amount that is higher than the first compensation amount if the determined difference also exceeds a second threshold that is higher than the first threshold.

11. The system of claim 9, further comprising additional programming instructions on the second non-transitory computer-readable memory portion that, when executed, are configured to cause a processor to:
determine a difference value between a first issue resolution rate and a second issue resolution rate for a plurality of additional call center agents;
compare the difference values for each of the call center agents; and
use the difference values to generate compensation value recommendations for each of the call center agents.

12. The system of claim 9, wherein the instructions for using the determined difference to generate a performance assessment for the call center agent comprise instructions to:
use the determined difference ($\delta_\theta$) between the first issue resolution rate and the second issue resolution rate to determine a measure of difference ($\delta_q$) between customer released calls and agent released calls as a function of an indication of call complexity (a) and a probability of a customer making a follow-up call (p) with a new problem as follows:

$$\delta_q = \frac{\delta_\theta}{a \cdot p^2},$$

and
considering a higher $\delta_q$ to represent a higher level of performance.

13. The system of claim 9, wherein:
the maintained data also comprises:
a measure of complexity for each call, and
for each of the one-time caller calls, an indication of whether the call was released by the customer or whether the call was released by the call center agent; and
the instructions for using the determined difference to generate a performance assessment for the call center agent comprise instructions to use the determined difference to determine a measure of difference between customer released calls and agent released calls as a function of the indication of call complexity and a probability of a customer making a follow-up call with a new problem.

14. The system of claim 9, wherein the instructions for identifying the set of one-time caller calls comprise instructions to:
for each of the calls, determine whether the call corresponded to a new problem call or an existing problem call;
determine a probability $P_1$ that each customer that made a new problem call will make the new problem call; and
determine a probability $P_2$ that each customer that made an existing problem call will make a follow-up call.

15. A method of assessing performance of a call center agent, the method comprising, by a processor:
retrieving, from a computer-readable memory, data corresponding to a plurality of customer calls processed by a call center agent, wherein the retrieved data for each call comprises:
an indication of whether the call was a one-time caller call, and
for each of the one-time caller calls, an indication of whether the call was released by the customer or whether the call was released by the call center agent; and
using the retrieved data to generate a performance assessment for the call center agent; and
taking an action corresponding to the performance assessment.

16. The method of claim 15, further comprising determining a one-time caller call rate, and wherein using the retrieved data to generate the performance assessment comprises generating the performance assessment based at least in part on a rate at which one-time caller calls were released by the customer or by the call center agent.

17. The method of claim 16, wherein using the retrieved data to generate the performance assessment further comprises:
determining a first issue resolution rate for the calls in the set that were released by the customer;
determining a second issue resolution rate for the calls in the set that were released by the call center agent;
determining a difference between the first issue resolution rate and the second issue resolution rate; and
using the determined difference to generate the performance assessment.

18. The method of claim 17, further comprising, by the processor, generating a compensation value recommendation for the call center agent based on the determined difference.

19. The method of claim 15, wherein:
the maintained data also comprises a measure of complexity for each call; and
wherein generating a performance assessment for the call center agent also uses a function of the measures of complexity and a probability of a customer making a follow-up call with a new problem.

20. The method of claim 15 wherein:
the retrieved data further comprises, for each calls, an indication of whether the call corresponded to a new problem call or an existing problem call; and
the method further comprises:
determining a probability $P_1$ that each customer that made a new problem call will make the new problem call; and
determining a probability $P_2$ that each customer that made an existing problem call will make a follow-up call.

* * * * *